US012757261B2

(12) United States Patent
Soma

(10) Patent No.: US 12,757,261 B2
(45) Date of Patent: Oct. 6, 2026

(54) WIRELESS COMMUNICATION APPARATUS FOR SIMULTANEOUS TRANSMIT AND RECEIVE(STR) / NON-SIMULTANEOUS TRANSMIT AND RECEIVE(NSTR) MODE SWITCHING IN MULTI-LINK COMMUNICATION, COMMUNICATION CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tomoyasu Soma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 18/518,252

(22) Filed: Nov. 22, 2023

(65) Prior Publication Data

US 2024/0179765 A1 May 30, 2024

(30) Foreign Application Priority Data

Nov. 28, 2022 (JP) ................................ 2022-189528

(51) Int. Cl.
*H04W 76/10* (2018.01)
*H04L 1/00* (2006.01)
(Continued)

(52) U.S. Cl.
CPC ........... *H04W 76/10* (2018.02); *H04L 1/0003* (2013.01); *H04L 5/0053* (2013.01); *H04W 76/20* (2018.02)

(58) Field of Classification Search
CPC .... H04W 76/10; H04W 76/20; H04L 1/0003; H04L 5/0053
(Continued)

(56) References Cited

U.S. PATENT DOCUMENTS

2011/0045802 A1* 2/2011 Bland ................. H04W 36/385 709/219
2015/0189493 A1* 7/2015 Lee ....................... H04W 76/10 370/329

(Continued)

FOREIGN PATENT DOCUMENTS

JP 2018050133 A 3/2018
WO 2022228131 A1 11/2022

OTHER PUBLICATIONS

Payam Torab, et al, Comment Resolution for of ML Reconfiguration, IEEE 802.11-21/534r3, Wireless LANs, May 2021.

(Continued)

*Primary Examiner* — Nicholas A Jensen
*Assistant Examiner* — Oladiran Gideon Olaleye
(74) *Attorney, Agent, or Firm* — Canon U.S.A., Inc. IP Division

(57) ABSTRACT

A wireless communication apparatus comprises: a communication unit configured to, in a case where a plurality of wireless links are established with another wireless communication apparatus, perform communication while switching an operation mode between a first operation mode in which while a packet is being transmitted to the other wireless communication apparatus via a first link of the plurality of wireless links, a packet can be received from the other wireless communication apparatus via a second link different from the first link, and a second operation mode in which while the packet is being transmitted in the first link, the packet is not received via the second link; and a control unit configured to control switching of the operation mode in accordance with a type of an application started up in the wireless communication apparatus.

13 Claims, 14 Drawing Sheets

(51) Int. Cl.
*H04L 5/00* (2006.01)
*H04W 76/20* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 2020/0229206 | A1* | 7/2020 | Badic | G05D 1/6445 |
| 2022/0337338 | A1* | 10/2022 | Homchaudhuri | H04W 52/0254 |
| 2023/0126559 | A1* | 4/2023 | Choi | H04M 1/72454<br>455/575.3 |

OTHER PUBLICATIONS

Yunbo Li, et al, CR of NSTR Capability update, IEEE 802.11-18/0149r02 Wireless LANs, Jan. 2022.

Frank Hsu, et al., LB 266 CR for Capability Update Notification, IEEE 802.11-22/1683r0, Wireless LANs, Aug. 2022.

* cited by examiner

FIG. 11A

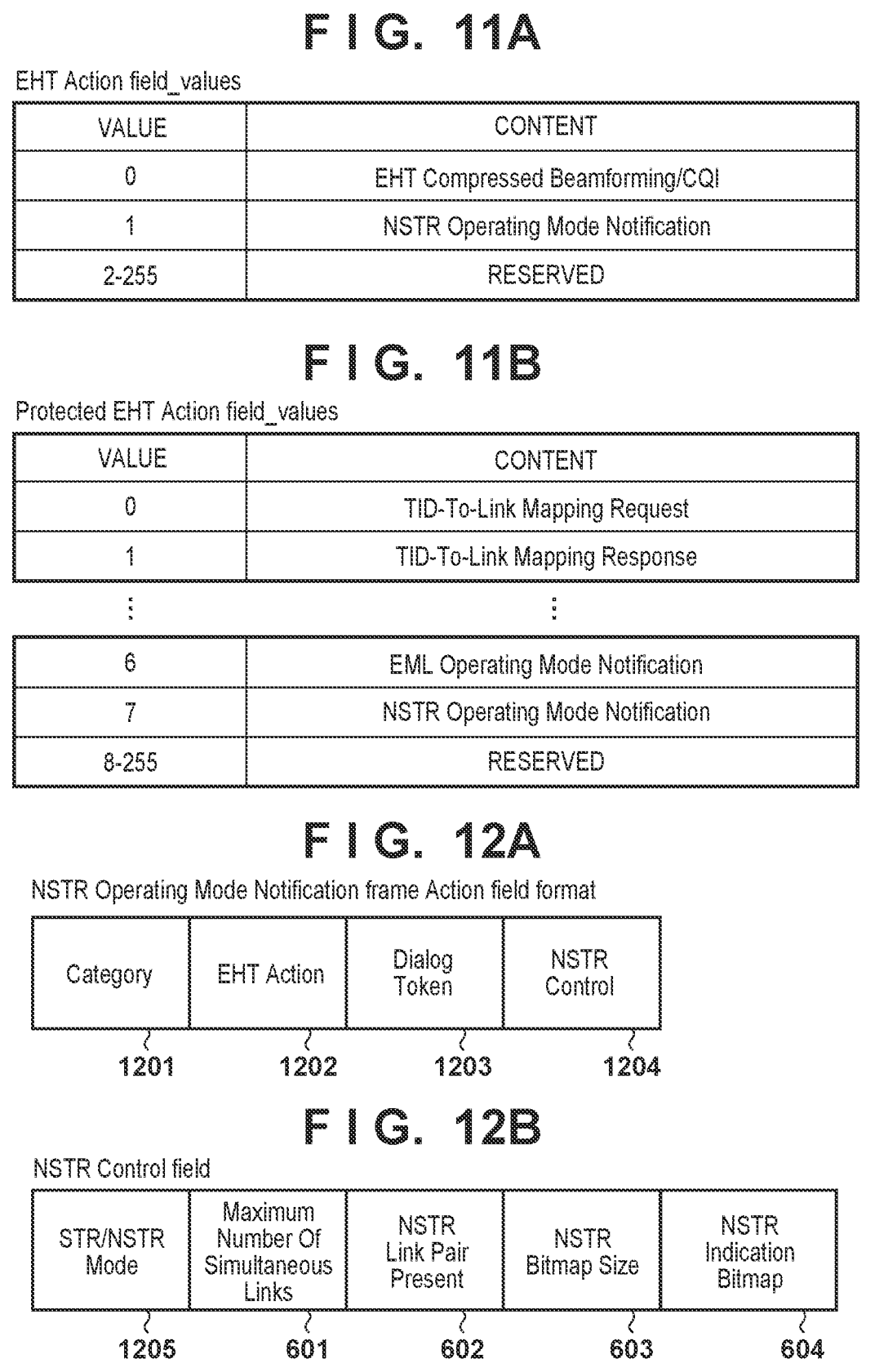

EHT Action field_values

| VALUE | CONTENT |
|---|---|
| 0 | EHT Compressed Beamforming/CQI |
| 1 | NSTR Operating Mode Notification |
| 2-255 | RESERVED |

FIG. 11B

Protected EHT Action field_values

| VALUE | CONTENT |
|---|---|
| 0 | TID-To-Link Mapping Request |
| 1 | TID-To-Link Mapping Response |
| ⋮ | ⋮ |
| 6 | EML Operating Mode Notification |
| 7 | NSTR Operating Mode Notification |
| 8-255 | RESERVED |

FIG. 12A

NSTR Operating Mode Notification frame Action field format

| Category | EHT Action | Dialog Token | NSTR Control |
|---|---|---|---|
| 1201 | 1202 | 1203 | 1204 |

FIG. 12B

NSTR Control field

| STR/NSTR Mode | Maximum Number Of Simultaneous Links | NSTR Link Pair Present | NSTR Bitmap Size | NSTR Indication Bitmap |
|---|---|---|---|---|
| 1205 | 601 | 602 | 603 | 604 |

| Control ID Value | Meaning |
|---|---|
| 0 | Triggered response scheduling(TRS) |
| 1 | Operating mode(OM) |
| ⋮ | ⋮ |
| 9, 11-14 | Reserved |
| 15 | Ones need expantion surely(ONES) |

1801 1802

| APPLICATION | INTER-LINK INTERFERENCE SMALL | INTER-LINK INTERFERENCE LARGE |
|---|---|---|
| PRINT | STR | NSTR |
| SCAN | STR | STR |
| UPDATE SYSTEM | STR | NSTR |

WIRELESS COMMUNICATION APPARATUS FOR SIMULTANEOUS TRANSMIT AND RECEIVE(STR) / NON-SIMULTANEOUS TRANSMIT AND RECEIVE(NSTR) MODE SWITCHING IN MULTI-LINK COMMUNICATION, COMMUNICATION CONTROL METHOD, AND NON-TRANSITORY COMPUTER-READABLE STORAGE MEDIUM

BACKGROUND

Field

The present disclosure relates to a wireless communication apparatus, a communication control method, and a non-transitory computer-readable storage medium.

Description of the Related Art

In recent years, wireless communication technologies such as a wireless local area network (LAN) have been developed. As the main communication standard of a wireless LAN, the Institute of Electrical and Electronics Engineers (IEEE) 802.11 standard series is known. For example, in the latest IEEE802.11ax standard, a technique of improving a communication speed in a congestion state using orthogonal frequency division multiple access (OFDMA) has been standardized, in addition to a throughput that is as high as 9.6 Gbits per second (Gbps) at maximum (Japanese Patent Laid-Open No. 2018-50133).

As a succeeding standard aiming at further throughput improvement, improvement of the frequency utilization efficiency, and communication latency improvement, a task group called IEEE802.11be has been established. In the IEEE802.11be, multi-link (ML) communication has been examined, in which one access point (AP) establishes a plurality of links with one station (STA) using frequency bands such as the 2.4 GHZ, 5 GHZ, and 6 GHz bands and performs simultaneous communication. In the ML communication, studies on two operation modes including a Simultaneous Transmit and Receive (STR) mode and a Non-Simultaneous Transmit and Receive (NSTR) mode are underway. The STR mode is an operation mode in which each link can independently transmit and receive data at a free timing, and the NSTR mode is an operation mode in which each link can perform simultaneous reception or simultaneous transmission but cannot perform simultaneous transmission/reception.

Here, in the NSTR mode, since simultaneous transmission/reception is impossible, there may be restrictions on data transmission/reception timings in each link, and the communication efficiency may be low as compared to the STR mode. On the other hand, in the STR mode, depending on the frequency intervals between links or the bandwidth of data, it may be impossible to ensure isolation between the links, and interference may occur between the links, resulting in lowering of throughput.

As described above, there is a problem that the communication efficiency may lower depending on the operation mode in the multi-link communication.

SUMMARY

Among other things, the present disclosure provides a method of preventing the communication efficiency from lowering depending on an operation mode in multi-link communication.

According to one embodiment of the present disclosure, a wireless communication apparatus is provided that comprises: a communication unit configured to, in a case where a plurality of wireless links are established with another wireless communication apparatus, perform communication while switching an operation mode between a first operation mode in which while a packet is being transmitted to the other wireless communication apparatus via a first link of the plurality of wireless links, a packet can be received from the other wireless communication apparatus via a second link different from the first link, and a second operation mode in which while the packet is being transmitted in the first link, the packet is not received via the second link; and a control unit configured to control switching of the operation mode in accordance with a type of an application started up in the wireless communication apparatus.

Further features of the present disclosure will become apparent from the following description of exemplary embodiments (with reference to the attached drawings).

BRIEF DESCRIPTION OF THE DRAWINGS

FIG. 11A is a view showing an example of the configuration of an EHT Action field value according to the embodiment;

FIG. 11B is a view showing an example of the configuration of a Protected EHT Action field value according to the embodiment;

FIG. 12A is a view showing an example of a frame format according to the embodiment;

FIG. 12B is a view showing an example of a frame format according to the embodiment;

DESCRIPTION OF THE EMBODIMENTS

Figure 1:
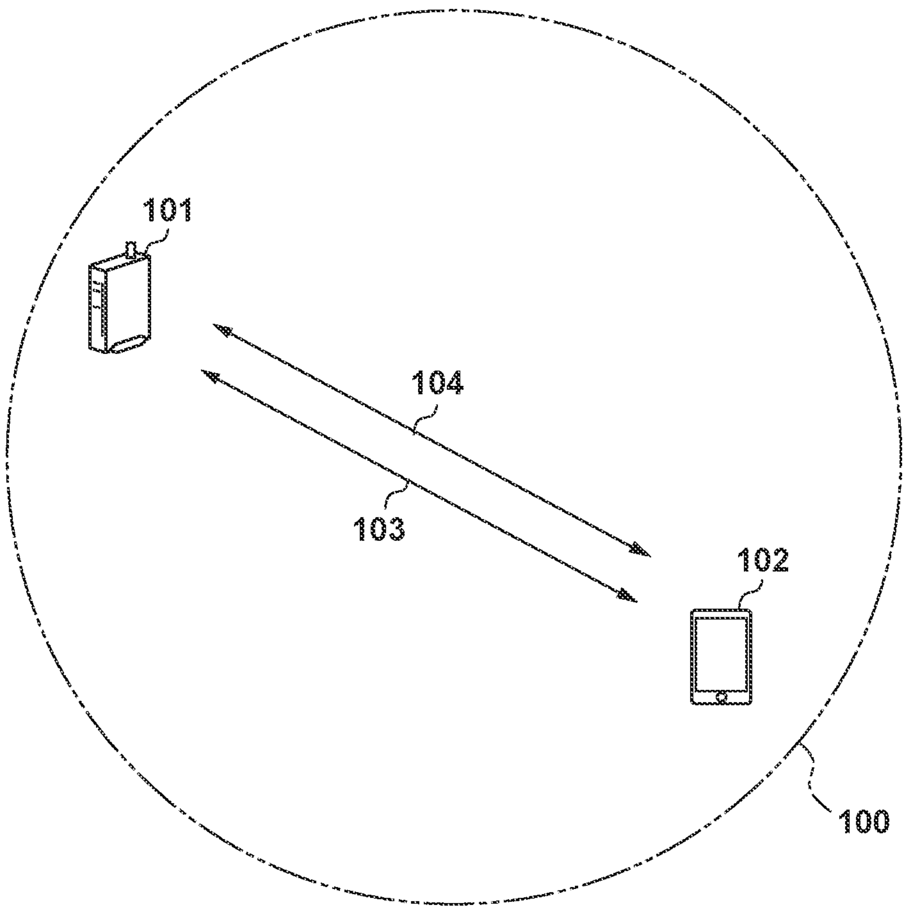
FIG. 1 is a view showing the overall configuration of a network according to the embodiment.

Hereinafter, embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

First Embodiment (Configuration of Wireless Communication System)

FIG. 1 shows the configuration of a network in which a communication apparatus 101 (to be referred to as a Non-AP MLD 101 hereinafter) according to this embodiment participates. A communication apparatus 102 (to be referred to as an AP MLD 102 hereinafter) is a wireless communication apparatus having a role of an access point (AP) that constructs a wireless network 100. The AP MLD 102 can communicate with the Non-AP MLD 101. This embodiment is applied to each of the Non-AP MLD 101 and the AP MLD 102. In the following explanation, the Non-AP MLD 101 and the AP MLD 102 may be referred to as MLDs without discrimination.

In this embodiment, an MLD executes wireless communication complying with the Institute of Electrical and Electronics Engineers (IEEE) 802.11be standard. However, the MLD need only be able to perform multi-link communication to be described later, and the present invention is not limited to this. The MLD can communicate at frequencies in the 2.4-Hz band, the 5-GHz band, and the 6-GHz band. The frequency bands used by each communication apparatus are not limited to these and, for example, the 60-GHz band may be used. Also, the MLD can communicate using bandwidths of 20 MHz, 40 MHZ, 80 MHz, 160 MHz, and 320 MHz. The bandwidths used by each communication apparatus are not limited to these and, for example, a bandwidth of 240 MHz or 4 MHz may be used.

The MLD executes OFDMA communication complying with the IEEE802.11be standard, thereby implementing multi-user (MU) communication in which signals of a plurality of users are multiplexed. OFDMA is short for Orthogonal Frequency Division Multiple Access. In the OFDMA communication, a part (resource unit (RU)) of a divided frequency band is assigned to each STA without overlap, and the carrier waves of the STAs are orthogonal to each other. For this reason, an AP can parallelly communicate with a plurality of STAs within a defined bandwidth.

In general, an electromagnetic wave attenuates in accordance with a wavelength. Hence, when propagating through the same distance, the lower the frequency is, the smaller the attenuation is, and the higher the frequency is, the larger the attenuation is. There is also known that the lower the frequency is, the larger the diffraction of an electromagnetic wave is, and the higher the frequency is, the smaller the diffraction is. For this reason, even if an obstacle exists on a propagation path, an electromagnetic wave having a low frequency goes around the obstacle and reaches. However, an electromagnetic wave having a high frequency can hardly go around the obstacle and may be unable to reach because of its high rectilinear advancing property. On the other hand, a frequency of 2.4 GHz is often used by other devices, and it is known that an electronic oven generates an electromagnetic wave of the same frequency band. In this way, even in an electromagnetic wave generated by the same device, the strength or signal/noise (SN) ratio of the reaching electromagnetic wave is considered to change in accordance with the frequency band, depending on the place or environment to arrange.

Note that the Non-AP MLD 101 and the AP MLD 102 support the IEEE802.11be standard, and in addition to this, these may support a legacy standard that is a standard before the IEEE802.11be standard. More specifically, the Non-AP MLD 101 and the AP MLD 102 may support at least one of the IEEE802.11a/b/g/n/ac/ax standards. Alternatively, they may support a standard succeeding the IEEE802.11be. In this embodiment, a description will be made assuming that the MLD is a wireless communication apparatus that performs communication complying with the IEEE802.11be standard.

In addition to the IEEE802.11 standard, the MLD may support another communication standard such as Bluetooth®, Near Field Communication (NFC), or Ultra Wide Band (UWB). Also, in addition to the IEEE802.11 standard, the MLD may support another communication standard such as ZigBee or Multi Band OFDM Alliance (MBOA). The UWB includes wireless USB, wireless 1394, and WiNET. The Non-AP MLD 101 and the AP MLD 102 may support a communication standard of wired communication such as a wired LAN.

Detailed examples of the AP MLD 102 are a wireless LAN router and a personal computer (PC), but are not limited to these. The AP MLD 102 may be a wireless communication apparatus including a wireless chip capable of executing wireless communication complying with the IEEE802.11be standard. Detailed examples of the Non-AP MLD 101 are a camera, a tablet, a smartphone, a PC, a portable telephone, a video camera, a headset, a printer, and a multi function peripheral (MFP), but are not limited to these. The Non-AP MLD 101 may be a wireless communication apparatus including a wireless chip capable of executing wireless communication complying with the IEEE802.11be standard.

Also, the Non-AP MLD 101 executes multi-link (ML) communication in which communication is performed by establishing wireless links with the AP MLD 102 that is an external apparatus via a plurality of frequency channels. In the IEEE802.11 series standard, the bandwidth of each frequency channel is defined as 20 MHz. Here, the frequency channel is a frequency channel defined in the IEEE802.11 series standard, and a plurality of frequency channels are defined in each of the 2.4-GHz band, the 5-GHz band, the 6-GHz band, and the 60-GHz band. Note that a bandwidth of 40 MHz or more may be used as one frequency channel by performing channel bonding for bundling a plurality of adjacent frequency channels.

For example, the AP MLD 102 has a capability of establishing a link via a first frequency channel of the 2.4-GHz band with the Non-AP MLD 101 and performing communication. The Non-AP MLD 101 has a capability of, in parallel with this, establishing a wireless link via a second frequency channel of the 5-GHz band with the AP MLD 102 and performing communication. In this case, the Non-AP MLD 101 executes multi-link communication that maintains a second wireless link via the second frequency channel in parallel with the wireless link via the first frequency channel. Thus, the AP MLD 102 establishes the wireless link via the plurality of frequency channels with the Non-AP MLD 101, thereby improving throughput in the communication with the Non-AP MLD 101.

Note that as for the link between the communication devices, a plurality of wireless links of different frequency bands may be established in multi-link communication. For example, the Non-AP MLD 101 may establish a wireless link in each of the 2.4-GHz band, the 5-GHz band, and the 6-GHz band. Alternatively, the Non-AP MLD 101 may establish wireless links via a plurality of different channels included in the same frequency band. For example, a wireless link of 6 ch in the 2.4-GHz band may be established as a first wireless link, and in addition to this, a wireless link of 1 ch in the 2.4-GHz band may be established as a second wireless link. Note that wireless links of the same frequency band and wireless links of different frequency bands may coexist. For example, the Non-AP MLD 101 may establish a wireless link in the 2.4-GHz band as the first wireless link, a wireless link of 1 ch in the 2.4-GHz band as the second wireless link, and a wireless link of 149 ch in the 5-GHz band as a third wireless link. If the Non-AP MLD 101 and the AP MLD 102 establish a plurality of different wireless links, even if a predetermined channel is congested, communication with the Non-AP MLD 101 can be established via a channel different from the predetermined channel. This can prevent lowering of throughput and communication delay in the communication with the Non-AP MLD 101.

Note that the wireless network shown in FIG. 1 includes one AP MLD and one Non-AP MLD. However, the number of AP MLDs, the number of Non-AP MLDs, and arrangement of these are not limited to these. For example, two or more Non-AP MLDs may be connected to the wireless network shown in FIG. 1. The number of frequency bands of each wireless link to be established at this time, the number of wireless links, and the frequency widths are not particularly limited.

When performing multi-link communication, each of the AP MLD 102 and the Non-AP MLD 101 transmits/receives data to/from the partner apparatus via a plurality of wireless links.

The AP MLD 102 and the Non-AP MLD 101 may execute Multiple-Input And Multiple-Output (MIMO) communication. In this case, each of the AP MLD 102 and the Non-AP MLD 101 includes a plurality of antennas, and the transmitting-side device sends different signals from the antennas using the same frequency channel. The receiving side simultaneously receives the signals using the plurality of antennas, demultiplexes the signal of each stream from the received signals, and decodes it. Thus, by executing MIMO communication, the AP MLD 102 and the Non-AP MLD 101 can communicate more data in the same time as compared to a case where MIMO communication is not executed. Also, when performing multi-link communication, the AP MLD 102 and the Non-AP MLD 101 may execute MIMO communication in some wireless links.

Figure 2:
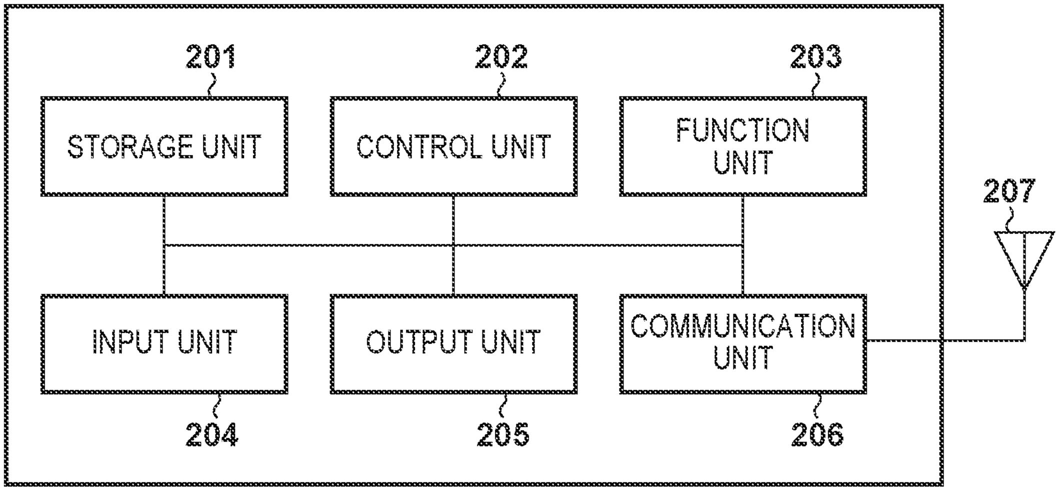
FIG. 2 is a view showing the hardware configuration of a communication apparatus according to the embodiment.

FIG. 2 shows an example of the hardware configuration of the Non-AP MLD 101 according to this embodiment. The Non-AP MLD 101 includes a storage unit 201, a control unit 202, a function unit 203, an input unit 204, an output unit 205, a communication unit 206, and an antenna 207. Note that a plurality of antennas may be provided. The AP MLD 102 has the same hardware configuration as described above.

The storage unit 201 is formed by one or more memories such as a ROM and a RAM, and stores various kinds of information such as computer programs configured to perform various kinds of operations to be described later and communication parameters for wireless communication. ROM is short for Read Only Memory, and RAM is short for Random Access Memory. Note that as the storage unit 201, other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used. Also, the storage unit 201 may include a plurality of memories.

The control unit 202 is formed by, for example, one or more processors such as a central processing unit (CPU) or a micro processing unit (MPU). The one or more processors of the control unit 202 execute a computer program stored in the storage unit 201, thereby controlling the entire Non-AP MLD 101. Note that the control unit 202 may control the entire Non-AP MLD 101 by cooperation of a computer program stored in the storage unit 201 and an operating system (OS). Also, the control unit 202 generates data and signals (wireless frames) to be transmitted in communication with another communication apparatus. The control unit 202 may include a plurality of processors such as multi-core processors and control the entire Non-AP MLD 101 by the plurality of processors.

In addition, the control unit 202 executes predetermined processing such as wireless communication, image capturing, printing, or projection by controlling the function unit 203. The function unit 203 is hardware used by the Non-AP MLD 101 to execute predetermined processing. For example, if the Non-AP MLD 101 is an MFP, the function unit 203 includes a printer unit (printing unit) that performs printing on a print medium, and a scanner unit (reading unit) that acquires a read image obtained by reading a print medium. The function unit 203 may include a camera unit (image capturing unit) and a projector (projection unit).

The input unit 204 functions as an acceptance unit that accepts various kinds of operations from the user. The input unit 204 includes, for example, at least one input interface such as a touch display, buttons, a mouse, or a microphone. The output unit 205 includes at least one of a display and a speaker, and performs various kinds of outputs to the user via a monitor screen or the speaker. In an example, the output unit 205 may be an indicator such as an LED, or a vibration output unit that vibrates in a predetermined pattern. Note that the input unit 204 and the output unit 205 may be implemented by one module, like a touch panel. Also, each of the input unit 204 and the output unit 205 may be integrated with the Non-AP MLD 101 or may be a separate body.

The communication unit 206 controls wireless communication complying with the IEEE802.11be standard. In addition to the IEEE802.11be standard, the communication unit 206 may control wireless communication complying with another IEEE802.11 series standard, or control wired communication such as a wired LAN. The communication unit 206 controls the antenna 207, thereby transmitting/receiving signals for wireless communication, which are generated by the control unit 202.

Note that if the Non-AP MLD 101 supports the NFC standard or the Bluetooth standard, in addition to the IEEE802.11be standard, control of wireless communication complying with these communication standards may be performed. In addition, if the Non-AP MLD 101 can execute wireless communication complying with a plurality of communication standards, a communication unit and an antenna corresponding to each communication standard may individually be provided. The Non-AP MLD 101 communicates data such as image data, document data, or video data with the AP MLD 102 via the communication unit 206. Note that the antenna 207 may be a body separated from the communication unit 206, or may be integrated with the communication unit 206 to form one module.

The antenna 207 is an antenna capable of performing communication in the 2.4-GHz band, the 5-GHz band, and the 6-GHz band. In this embodiment, the Non-AP MLD 101 include one antenna, but may include two or more antennas. The Non-AP MLD 101 may include a different antenna for each frequency band. If there are a plurality of antennas, the Non-AP MLD 101 may include the communication unit 206 corresponding to each antenna.

The AP MLD 102 has the same hardware configuration as the Non-AP MLD 101, but the present invention is not limited to this. For example, the configurations of the input unit 204 and the output unit 205 may change between the AP MLD 102 and the Non-AP MLD 101.

Figure 3:
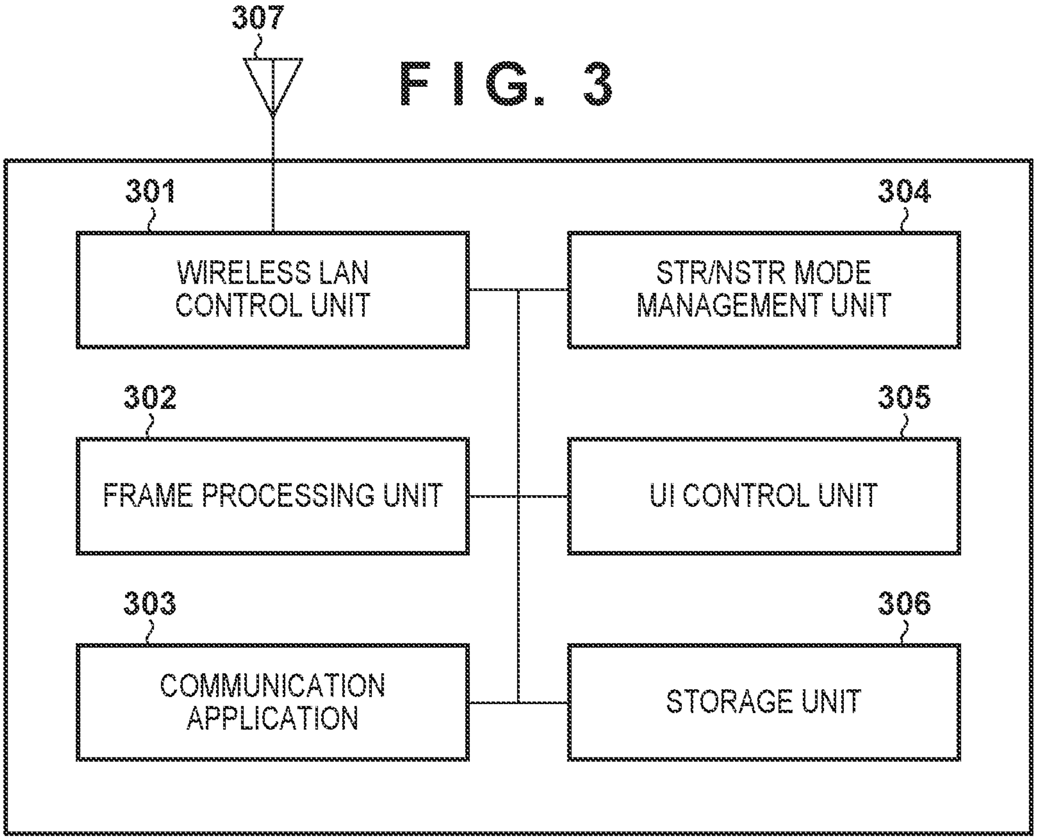
FIG. 3 is a view showing the functional configuration of the communication apparatus according to the embodiment.

FIG. 3 is a block diagram showing the functional configuration of the Non-AP MLD 101 according to this embodiment. Note that the AP MLD 102 also has the same configuration but may partially be different. Here, the Non-AP MLD 101 includes a wireless LAN control unit 301. Note that the number of wireless LAN control units is not limited to one, and may be two or more. The Non-AP MLD 101 further includes a frame processing unit 302, a communication application 303, an STR/NSTR mode management unit 304, a UI control unit 305, and a storage unit 306.

The wireless LAN control unit 301 is configured to include an antenna and a circuit configured to transmit/receive wireless signals to/from another wireless LAN apparatus, and a program configured to control these. In accordance with the IEEE802.11 standard series, the wireless LAN control unit 301 executes communication control of a wireless LAN based on a frame generated by the frame processing unit 302.

The frame processing unit 302 processes a wireless control frame transmitted/received by the wireless LAN control unit 301. A restriction may be imparted to the contents of wireless control to be generated and analyzed by the frame processing unit 302 in accordance with settings stored in the storage unit 306. The contents may be changed by user settings from the UI control unit 305. The information of a generated frame is sent to the wireless LAN control unit 301 and transmitted to the external apparatus of the communication partner. The information of the frame received by the wireless LAN control unit 301 is transferred to the frame processing unit 302 and analyzed.

Examples of the communication application 303 are an application that transfers an image of a digital camera to a smartphone or a PC, and an application that transfers print data or scan data between an MFP and a PC. A more detailed application will be shown in the embodiment to be described later. The communication application 303 sets the operation mode of its own to the STR/NSTR mode management unit 304 at the time of start-up of the application.

A Simultaneous Transmit and Receive (STR) mode is an operation mode (first operation mode) in which during transmission of a packet in one link (first link), a packet can be received in another link (second link). That is, the STR mode is an operation mode in which links independently operate, and transmission/reception can simultaneously be performed in the links. A Non-Simultaneous Transmit and Receive (NSTR) mode is an operation mode (second operation mode) in which during transmission of a packet in one link, reception of a packet cannot be performed in another link.

If the interference between the plurality of links established between the Non-AP MLD 101 and the AP MLD 102 is small, throughput is improved by operating in the STR mode, thereby improving the communication efficiency. On the other hand, in a case where the interference between the links is large, if operating in the STR mode, transmission in one link is routed to reception in another link, resulting in low reception quality. For this reason, depending on the interference between the links, if operating in the STR mode, throughput may lower.

On the other hand, if operating in the NSTR mode, the influence of the interference between the links can be suppressed. However, since the transmission/reception timing of one link imparts a restriction to the transmission/reception timing of another link, it may be impossible to improve throughput as compared to the STR mode.

As described above, operating in the STR mode as much as possible is preferable. Depending on the interference between the links, throughput can be improved by operating in the NSTR mode. Here, even if there is interference between the links, depending on the Modulation and Coding Scheme (MCS) of a packet to be received, packet reception may be possible although the reception quality lowers. Particularly, in a communication application in which data is mainly transmitted from one communication apparatus, and packet with a low MCS, like an ACK (acknowledgement) packet or a NACK (negative acknowledgement) packet, are dominant in reception packets from the other communication apparatus, throughput can be improved in the STR mode. On the other hand, in a case where a data amount to be transmitted and a data amount to be received substantially equal, or in a case of a communication application that mainly transmits/receives a large packet with a high MCS, the influence of inter-link interference can be suppressed by operating in the NSTR mode. In a communication application other than these, an arbitrary mode may be set, or an operation mode need not be set on the communication application side. The STR/NSTR mode management unit 304 manages whether the link used by the communication application 303 for communication should operate in the STR mode or the NSTR mode. If the communication application sets an operation mode, the communication apparatus operates in accordance with the operation mode, and otherwise, an operation mode may be decided in accordance with a conventional standard. Based on the operation mode managed by the STR/NSTR mode management unit 304, a frame to be used by the frame processing unit 302 to notify the operation mode is generated and transmitted from the wireless LAN control unit 301.

The UI control unit 305 is configured to include hardware concerning a user interface such as a touch panel or buttons used to accept an operation on the Non-AP MLD 101 by the user and a program that controls these. Note that the UI control unit 305 also has a function for, for example, displaying an image or the like or presenting information such as voice output to the user.

The storage unit 306 is a storage device that can be formed by a ROM, a RAM, and the like, which store programs and data to operate the Non-AP MLD 101.

Figure 4:
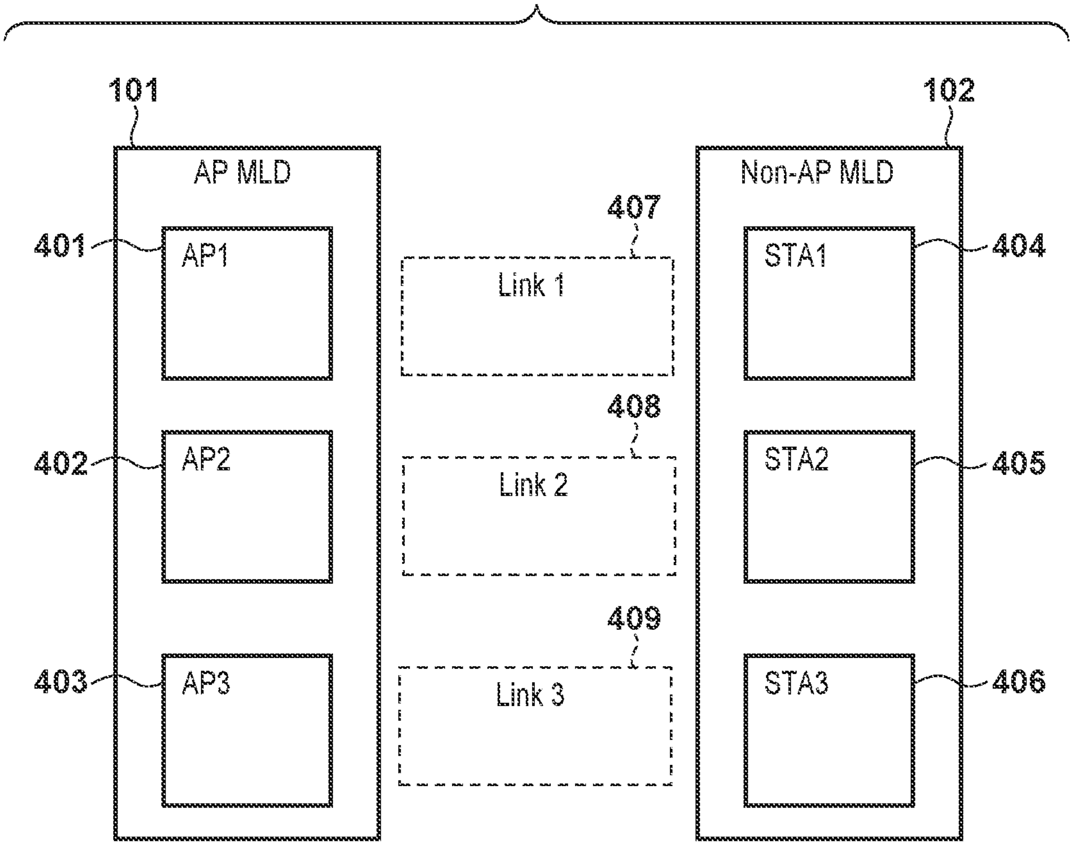
FIG. 4 is a view showing the outline of multi-link communication.

FIG. 4 shows the outline of multi-link communication executed by the AP MLD 102 and the Non-AP MLD 101 according to this embodiment.

A wireless communication apparatus that executes multi-link communication is called a Multi-Link Device (MLD), and one MLD includes a plurality of STAs and APs corresponding to each link. An MLD having the AP function is called an AP MLD, and an MLD that does not have the AP function is called a Non-AP MLD. Note that a communication apparatus that has the AP function but does not operate as an AP and participates in a network formed by another AP MLD is called a Non-AP MLD.

An AP1 401 and an STA1 404 in FIG. 4 establish a Link1 407 via a first frequency channel. Similarly, the AP2 402 and the STA2 405 establish a Link2 408 via a second frequency channel, and the AP3 403 and the STA3 406 establish a Link3 409 via a third frequency channel.

Here, the AP MLD 102 and the Non-AP MLD 101 establish connection via at least one or more frequency channels in the sub-GHz band, the 2.4-GHz band, the 3.6-GHz band, the 4.9- and 5-GHz bands, the 60-GHz band, and the 6-GHz band. The AP MLD 102 and the Non-AP MLD 101 maintain the connection of the second link via the second frequency channel in parallel with the connection of the first link via the first frequency channel. Not the connections in different frequency bands but a plurality of connections via different frequency channels in the same frequency band may be established.

In the multi-link operation, there is concern about lowering of reception throughput, which occurs when a transmission signal transmitted from a predetermined communication apparatus interferes with a signal (reception signal) transmitted from another communication apparatus, and the reception quality of the reception signal lowers. In communication in which reception is mainly performed, since lowering of throughput caused by interference may greatly affect efficiency, it is sometimes appropriate to use the NSTR mode. On the other hand, if the MCS of reception data is low, even if reception quality lowers, demodulation can be performed at high possibility, and therefore, it is not necessary to concern about lowering of throughput. For example, in a case where data transmission is mainly performed, ACK to transmission data is dominant in reception data. For ACK, the MCS is always set low. Hence, in this case, it is not necessary to worry about throughput lowering caused by interference on the reception side, and the operation in the STR mode poses no problem. Conventionally, the STR/NSTR operation mode is applied for each link. The opportunity of operating in the STR mode can be increased, by appropriately using the operation mode for each communication application to be used in consideration of a reception packet. Even in communication in which data transmission is mainly performed, and ACK is dominant in reception packets, in a case where data is divisionally transmitted via a plurality of links, operating in the STR mode in which restrictions on the timings of data transmission and ACK reception are eliminated is effective for improving efficiency. As an example of the communication application operable in the STR mode, an application configured to connect a camera that is a Non-AP MLD to a PC or a smartphone that is an AP MLD at the time of start-up of the application, and transfers an image captured by the camera to an external apparatus or a cloud is assumed. In this embodiment, if a plurality of applications simultaneously operate, the plurality of operating applications never share one link.

Figure 5:
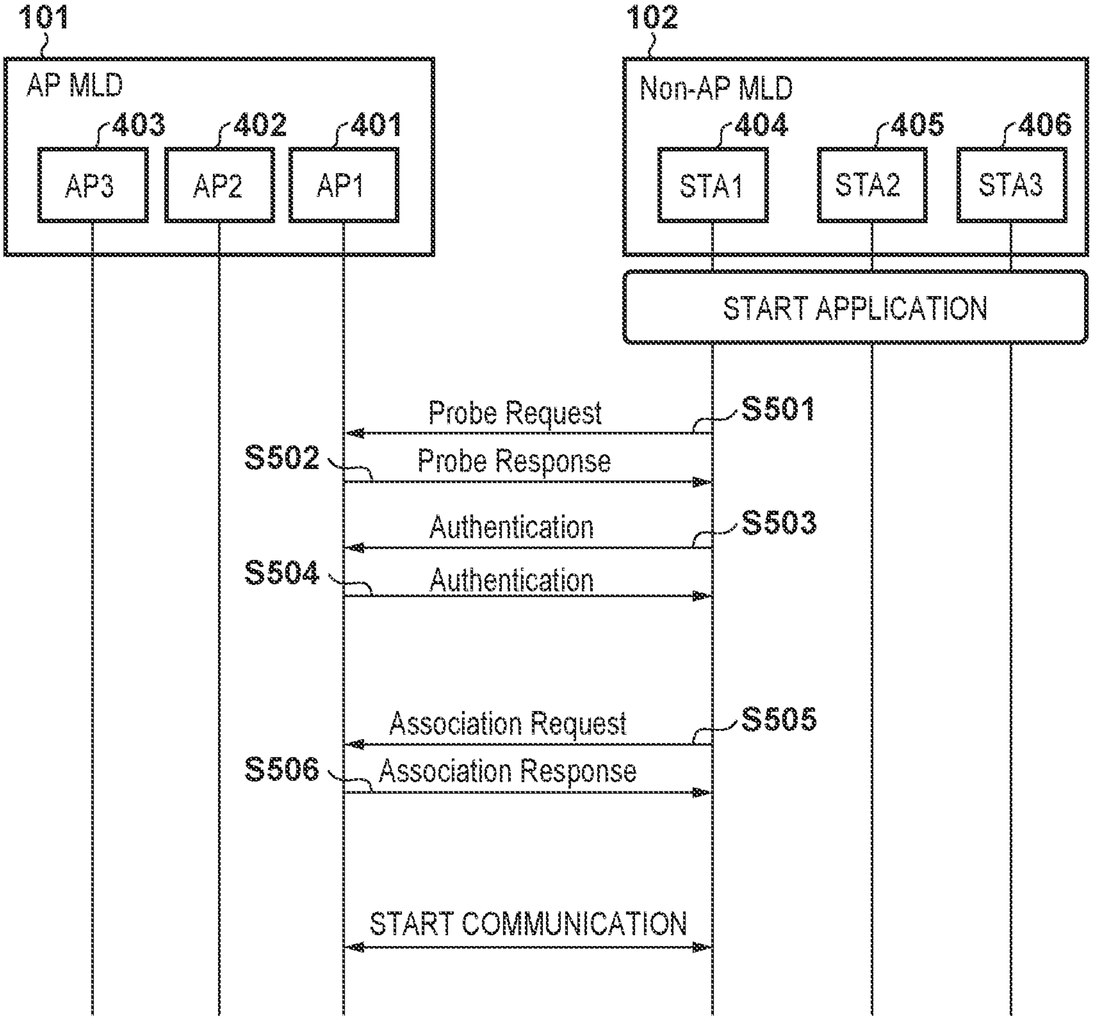
FIG. 5 is a sequence chart in operation mode switching according to the first embodiment.

FIG. 5 shows a sequence chart in STR/NSTR operation mode switching according to this embodiment. At the time of start-up of the communication application, the Non-AP MLD 101 operates in accordance with a normal connection establishment sequence. First, the Non-AP MLD 101 transmits a Probe Request frame to the AP MLD 102 (S501), and the AP MLD 102 returns a Probe Response frame to the request (S502). Next, the Non-AP MLD 101 transmits an Authentication frame for authentication, and in response to this, the AP MLD 102 returns an Authentication frame (S504). After the authentication, the Non-AP MLD 101 transmits an Association Request (S505). The AP MLD 102 that has received the Association Request returns an Association Response as a response to the request (S506). Thus, Multi-Link Setup is performed, and connection between the MLDs can be established. At this time, the Non-AP MLD includes information about STR/NSTR in the association request using a Basic Multi-Link element, thereby notifying a desired operation mode for the established link.

Figure 6:
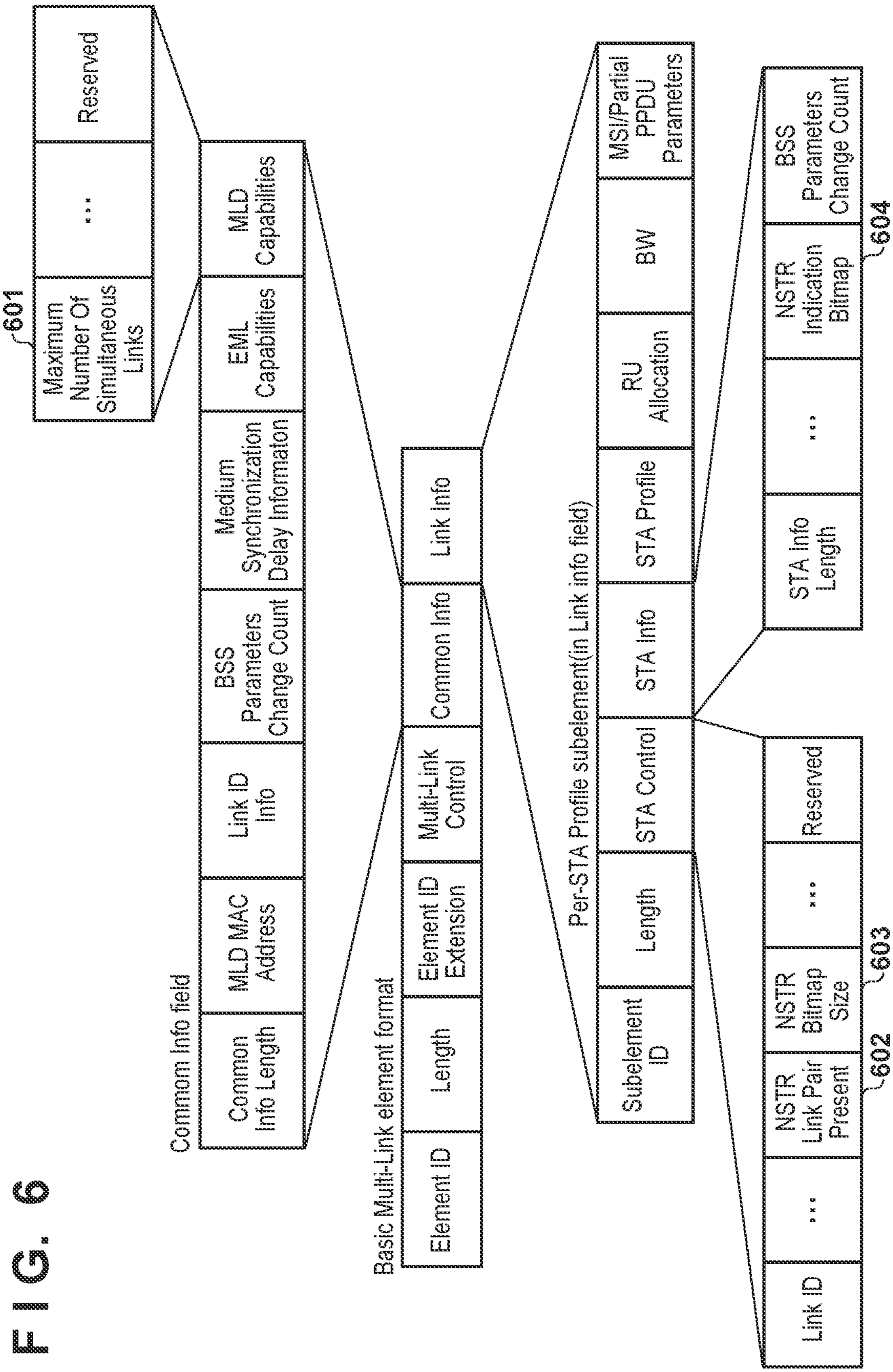
FIG. 6 is a view showing an example of the configuration of a Basic Multi-Link element format.

FIG. 6 shows the frame format of the Basic Multi-Link element, and fields concerning STR/NSTR included in it. A Maximum Number Of Simultaneous Links subfield (601) indicates the maximum number of STAs of an MLD that can perform simultaneous transmission/reception in each link. If a link capable of STR-operating exists, a value or 1 or more is always stored. An NSTR Link Pair Present subfield (602) indicates whether a pair of links that NSTR-operate exists if the Maximum Number Of Simultaneous Links subfield 601 is larger than zero. An NSTR Bitmap Size subfield (603) indicates whether the size of an NSTR Indication Bitmap (604) to be described next is 1 octet or 2 octets. The NSTR Indication Bitmap subfield (604) is a bitmap in which each bit corresponds to a Link ID, and which link is set to NSTR is shown. The Non-AP MLD transmits the Basic Multi-Link element including these subfields using the association request frame, thereby notifying the AP MLD of the operation mode of each link.

Figure 7:
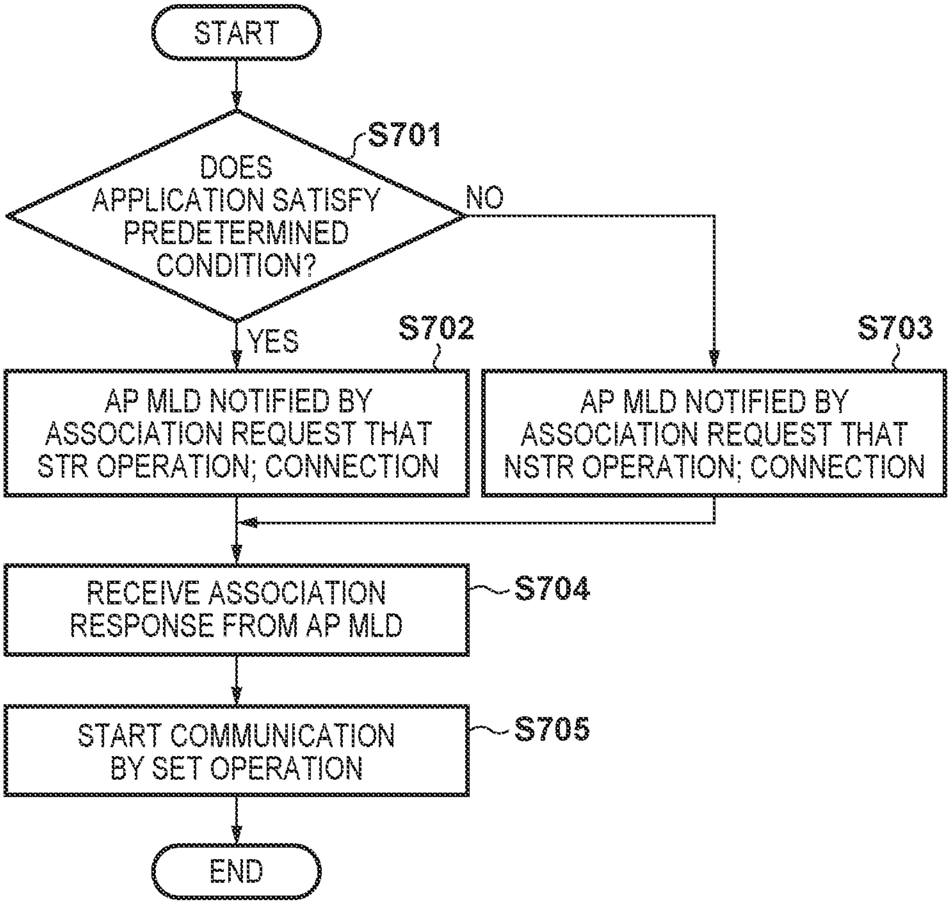
FIG. 7 is a flowchart showing the operation procedure of a communication apparatus (Non-AP MLD) according to the first embodiment.

FIG. 7 is a flowchart showing processing of the Non-AP MLD 101, which is started when the communication application is started up in this embodiment. The processing shown in FIG. 7 is implemented by the processor of the control unit 202 executing a program stored in the memory of the storage unit 201. Also, the processing shown in FIG. 7 is executed if the Non-AP MLD 101 accepts a start-up instruction of a predetermined application via a user operation or communication.

First, in step S701, the Non-AP MLD 101 determines whether the application started up satisfies a predetermined condition for operating in the STR mode.

The predetermined condition includes, for example, that the application started up is an application of a traffic pattern that mainly receives ACK. If ACK is dominant in packets received in one link, even if there is interference of a packet transmitted in another link, the ACK packet can be received because of a low MCS.

Here, that the MCS is low indicates that the encoding rate is low, or the number of bits assigned for each modulation symbol is small. Alternatively, if the combination of the encoding rate and the number of bits assigned for each modulation symbol is defined as a modulation and coding level in advance, that the MCS is low indicates that the modulation and coding level is lower. For example, in the IEEE802.11ax standard, 12 kinds of modulation and coding schemes from MCSO to MCS11 are defined. The smaller the number (index) at the end is, the higher the error resilience is. The larger the number is, the higher the transmission rate is. In this case, for example, an application in which the ratio of packets of a modulation and coding scheme of a small index, like MCSO to MCS4, to received packets is high may operate in the STR mode. An application in which the ratio of packets of a modulation and coding scheme from MCS5 to MCS11 is high may operate in the NSTR mode. For this reason, an application in which the ratio of packets of a modulation and coding scheme of a small index to received packets is high is set to operate in the STR mode, and an application in which the ratio of packets of a modulation and coding scheme of a small index is low is set to operate in the NSTR mode.

Also, the application of a traffic pattern that mainly receives ACK may be stored in the storage unit 201 in advance. For example, if the Non-AP MLD 101 that is an MFP executes a scan application, it mainly sends transmission packets for transmitting read image data to the AP MLD 102, and main packets received from the AP MLD 102 are ACK packets. On the other hand, if the Non-AP MLD 101 that is an MFP executes a print application, main packets received from the AP MLD 102 are not ACK packets because image data to be printed is received from the AP MLD 102. When the Non-AP MLD 101 stores, for each application, data representing whether ACK is dominant or not, it is possible to determine whether the application started up is an application of a traffic pattern that mainly receives ACK.

In another example, the predetermined condition is that the ratio of packets of a predetermined encoding rate or less to packets received in the application started up is a predetermined value or more. For example, a packet encoded at an encoding rate of ½ for the purpose of error correction can carry a smaller data amount as compared to a packet encoded at an encoding rate of ⅚, but the resilience to bit errors improves. For this reason, setting may be done such that an application in which, for example, the ratio of packets of an encoding rate of ½ or less is 80% or more can more readily operate in the STR mode than an application in which the ratio of packets of an encoding rate of ½ or less is 20% or more. When the Non-AP MLD 101 stores, for each application, data representing whether the ratio of packets of a predetermined encoding rate or less is high or not, it is possible to determine whether to operate the application started up in the STR mode.

Alternatively, the predetermined condition is that a packet received in the application started up is modulated by a modulation scheme in which the number of bits (modulation level) assigned for one modulation symbol is a predetermined value or less. For example, in a packet modulated by Binary Phase Shift Keying (BPSK), 1 bit is assigned for one symbol. In 64QAM (quadrature amplitude modulation), 6 bits are assigned for one symbol. In other words, in BPSK, the modulation level is 1 bit/symbol, and in 64QAM, the modulation level is 6 bits/symbol. If the modulation level is low, the data amount that can be carried is small as compared to a high modulation level, but the noise resistance improves. Hence, when the Non-AP MLD 101 stores, for each application, data representing whether the ratio of packets whose modulation level is a predetermined value or less is high or not, it is possible to determine whether to operate the application started up in the STR mode.

For example, depending on the application started up, the Non-AP MLD 101 may grasp the wireless communication capability of the AP MLD 102. In this case, in an application in which a packet received from the AP MLD 102 is encoded by an encoding method of a predetermined encoding rate or less, or modulated by a modulation scheme using a modulation level of a predetermined value or less, reception in the STR mode may be possible even if inter-link interference exists. If such an application is stored in the storage unit 201 in advance, it can be determined whether the application started up is an application that mainly receives packet of a predetermined encoding rate or less or a predetermined modulation level or less.

As described above, if an application that satisfies a predetermined condition to operate in the STR mode is started up (YES in step S701), the process advances to step S702. If the predetermined condition is not satisfied (NO in step S701), the process advances to step S703. In step S702, the AP MLD is notified by an association request message that an operation is performed in the STR mode, and connection processing is performed. In step S703, the AP MLD is notified by an association request message that an operation is performed in the NSTR mode, and connection processing is performed. However, in step S703, if the communication application determined "NO" in step S701 mainly performs reception of data of a high MCS, the AP MLD may be notified that an operation is performed in the NSTR mode. Otherwise, the operation mode may be notified in accordance with a conventional standard. After that, in step S704, an association response message to the request is received from the AP MLD, and connection is completed.

After the completion of connection, communication in the set operation mode can be performed, and data transmission/reception is performed (step S705). If data transmission/reception is completed, the processing shown in FIG. 7 is ended. In an example, the processing shown on FIG. 7 may be ended by receiving, from the user, an end instruction for instructing to end the communication.

As described above, the STR mode and the NSTR mode are switched in consideration of the packet received in the application started up. For example, there is a use case where when using an MFP (Non-AP MLD) connected to a network in an office, authentication is performed using an employment pass or ID card, and then, one of communication applications having a printer or scanner function is exclusively started up. In such a use case, a plurality of applications are neither started up nor share a link. In a scanner, data transmission is mainly performed, and ACK packets are dominant in reception packets. On the other hand, in a printer, reception of print target data is mainly performed. Hence, the operation modes are selectively used such that if a scanner application is started up, the STR mode is used, and if a printer application is started up, the NSTR mode is used. This can increase the opportunity of operating in the STR mode and improve the communication efficiency.

Additionally, if an application that lowers communication efficiency when operating in the STR mode because of the communication environment, for example, large inter-link interference is executed, since the application operates in the NSTR mode, the communication efficiency can be prevented from lowering.

Second Embodiment

In the first embodiment, connection to the AP MLD at the time of start-up of the communication application is assumed. A use case can also be considered, where the communication application is started up in a state in which the Non-AP MLD and the AP MLD are already connected. The second embodiment will be described using another communication application as an example.

In this embodiment, a case where a communication application is started up in a state in which a Non-AP MLD and an AP MLD are already connected, and the STR/NSTR operation is switched will be described. The same reference numerals as in the first embodiment denote the same functions, processes, or components, and a description thereof will be omitted.

In the first embodiment, the STR/NSTR operation mode notification is made using an association request message. Hence, to notify a change of the operation mode according to communication application switching, connection with the AP MLD 102 needs to be temporally disconnected.

Figure 8:
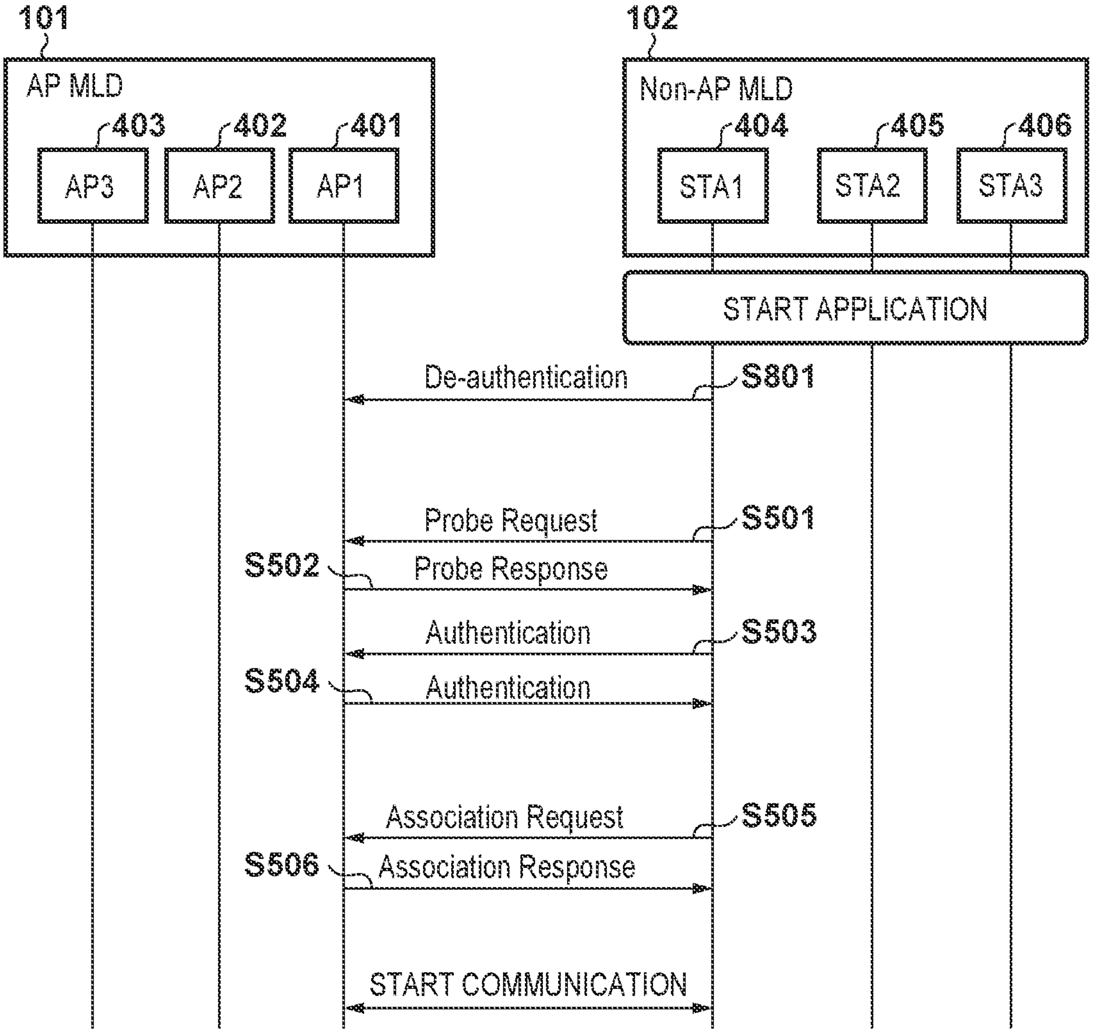
FIG. 8 is a sequence chart in operation mode switching according to the second embodiment.

FIG. 8 shows a sequence chart between a Non-AP MLD 101 and an AP MLD 102 according to this embodiment. At the time of start-up of a communication application, the Non-AP MLD 101 transmits a De-authentication frame to the AP MLD 102 to temporarily disconnect the connection state (S801). After that, the Non-AP MLD 101 sends a connection request to the AP MLD 102 again and notifies it which one of the STR/NSTR modes is used to operate in connection processing. Connection processing after disconnection is the same as in the first embodiment, and a description thereof will be omitted.

Figure 9:
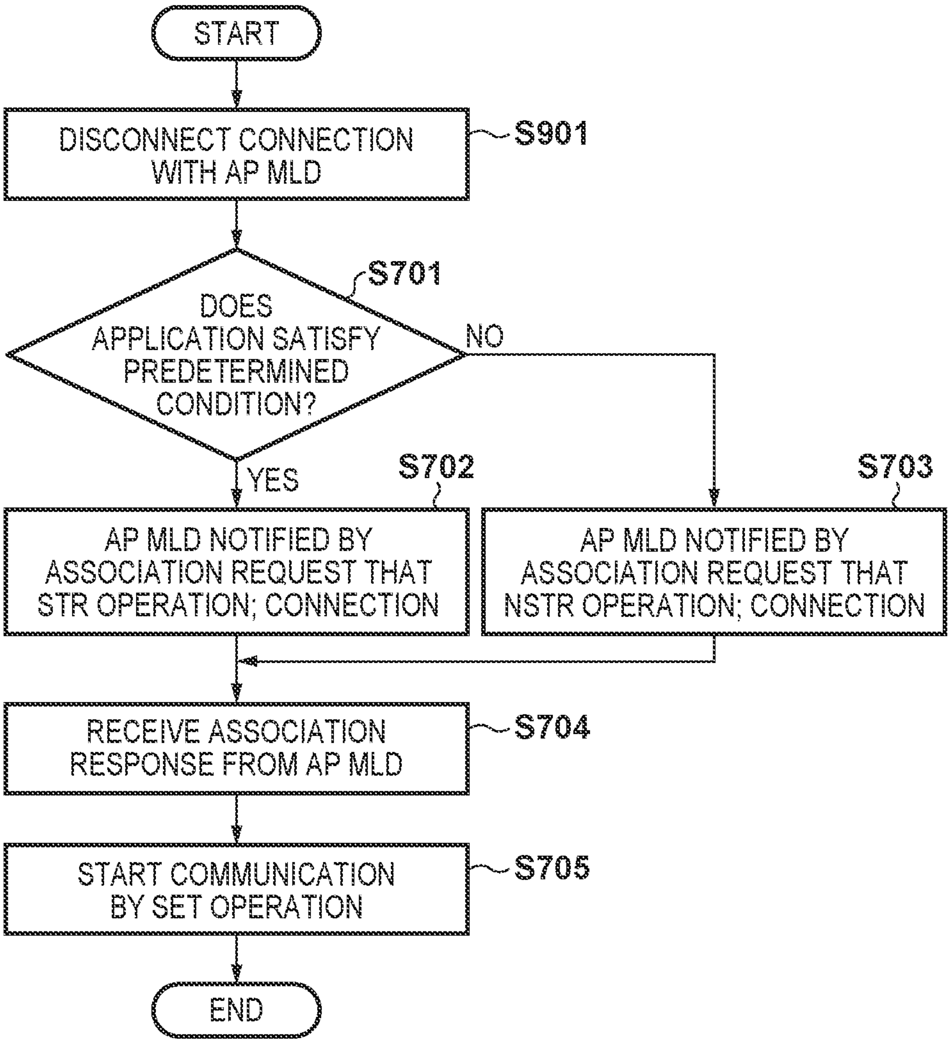
FIG. 9 is a flowchart showing the operation procedure of a communication apparatus (Non-AP MLD) according to the second embodiment.

FIG. 9 shows a flowchart showing processing of the Non-AP MLD 101 according to this embodiment. The processing shown in FIG. 9 is implemented by a control unit 202 of the Non-AP MLD 101 executing a program stored in a storage unit 201, like FIG. 7. Processing after processing for disconnecting from the AP MLD 102 in step S901 is the same as in the first embodiment, and a description thereof will be omitted.

As described above, even in a case where the communication application is switched in a state in which the Non-AP MLD 101 and the AP MLD 102 are connected, the same effect as in the first embodiment can be obtained.

Third Embodiment

In the second embodiment, disconnection processing and reconnection processing are performed at the time of start-up of the communication application. In actual use of the use case described as an example in this embodiment, a time lag corresponding to the disconnection processing may occur. Hence, in the third embodiment, a method capable of notifying a change of the STR/NSTR operation mode without performing disconnection processing even in a state in which the Non-AP MLD and the AP MLD are connected will be described.

In this embodiment, a method of notifying the STR/NSTR operation mode using a method other than an association request will be described. This makes it possible to make an STR/NSTR operation mode change notification without performing disconnection processing. Note that the same reference numerals as in the first and second embodiments denote the same functions, processes, or components, and a description thereof will be omitted.

Figure 10:
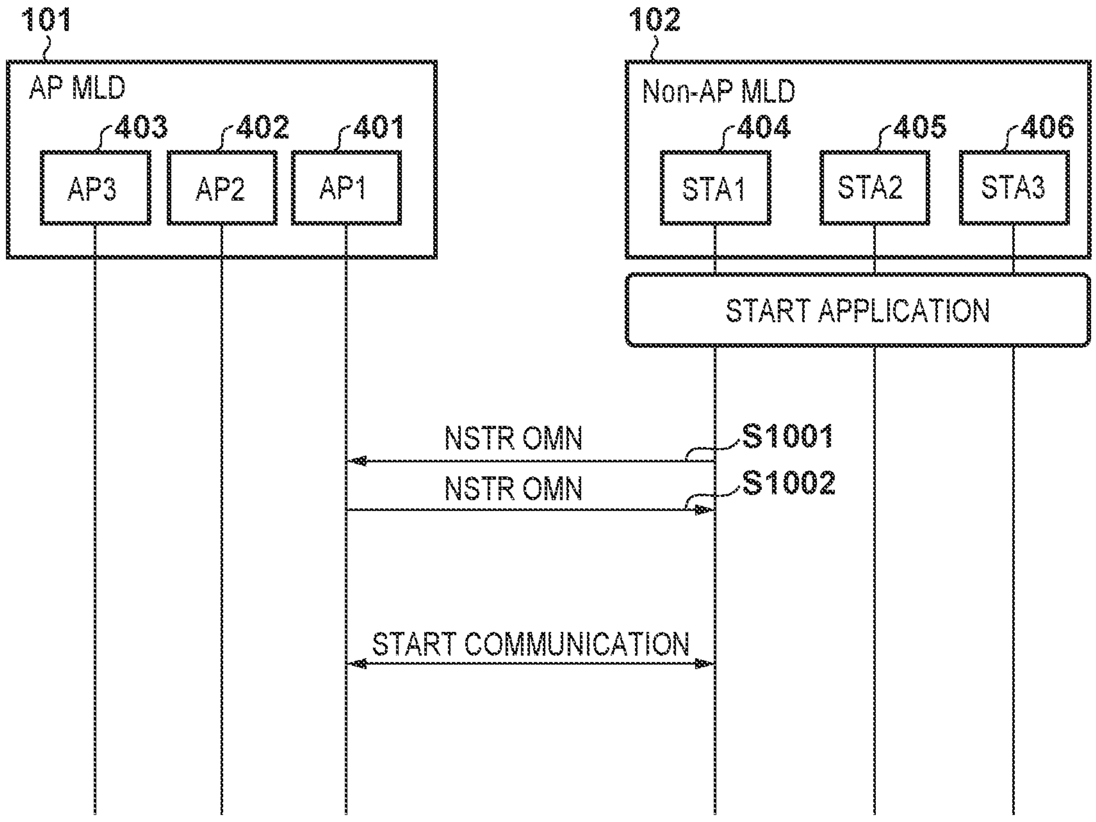
FIG. 10 is a sequence chart in operation mode switching according to the third embodiment.

FIG. 10 shows a process sequence chart between a Non-AP MLD 101 and an AP MLD 102 according to this embodiment. At the time of start-up of a communication application, the Non-AP MLD 101 transmits, to the AP MLD, an NSTR Operating Mode Notification (NSTR OMN) that is an action frame used to notify an operation mode (S1001). In response to this, the AP MLD 102 returns an NSTR OMN (S1002), thereby completing switching of the operation mode and starting communication.

FIGS. 11A and 11B show examples of types assigned to the action frame. In the IEEE802.11be standard, types are assigned to EHT Action field value and Protected EHT Action field value in the action frame. Currently, 0 of EHT Action field value and 0 to 6 of Protected EHT Action field value are used, and remaining values are "Reserved". As shown in FIGS. 11A and 11B, NSTR OMN is added as a type for notifying the STR/NSTR operation mode to one of the reserved field values. The name of the added type is NSTR OMN, but the name is not limited to this.

FIGS. 12A and 12B show examples of the configuration of the NSTR OMN field format and examples of fields included in it.

FIG. 12A shows an example of the configuration of the field format of the NSTR OMN action frame. A Category field 1201 indicates the category of the frame, and the type of the frame is defined by a value stored in this field. Whether it is an EHT Action frame or a Protected EHT Action frame is also defined by the value of this field. A value indicating a type shown in FIG. 11A is stored in an EHT Action field 1202. In this embodiment, the type associated with the NSTR OMN is stored in this filed, thereby using this to notify the STR/NSTR operation mode. A Dialog Token 1203 stores a value other than 0 when the frame is transmitted by the Non-AP MLD 101. The same value is stored when the AP MLD 102 responds to this. An NSTR Control field 1204 stores a subfield associated with the STR/NSTR operation mode. Details will be described below.

FIG. 12B shows an example of the configuration of subfields included in the NSTR Control field. Information about the STR/NSTR operation mode is included in the NSTR Control field. An STR/NSTR Mode subfield 1205 exclusively indicates which one of the STR and NSTR modes is used for the operation of a link to use. The remaining subfields are the same as the subfields of information about STR/NSTR included in the Basic Multi-Link element described in the first embodiment. The configuration of the NSTR Control field is not limited to this. Arbitrary subfields of the plurality of subfields may be used in combination, and another subfield may be added.

Figure 13:
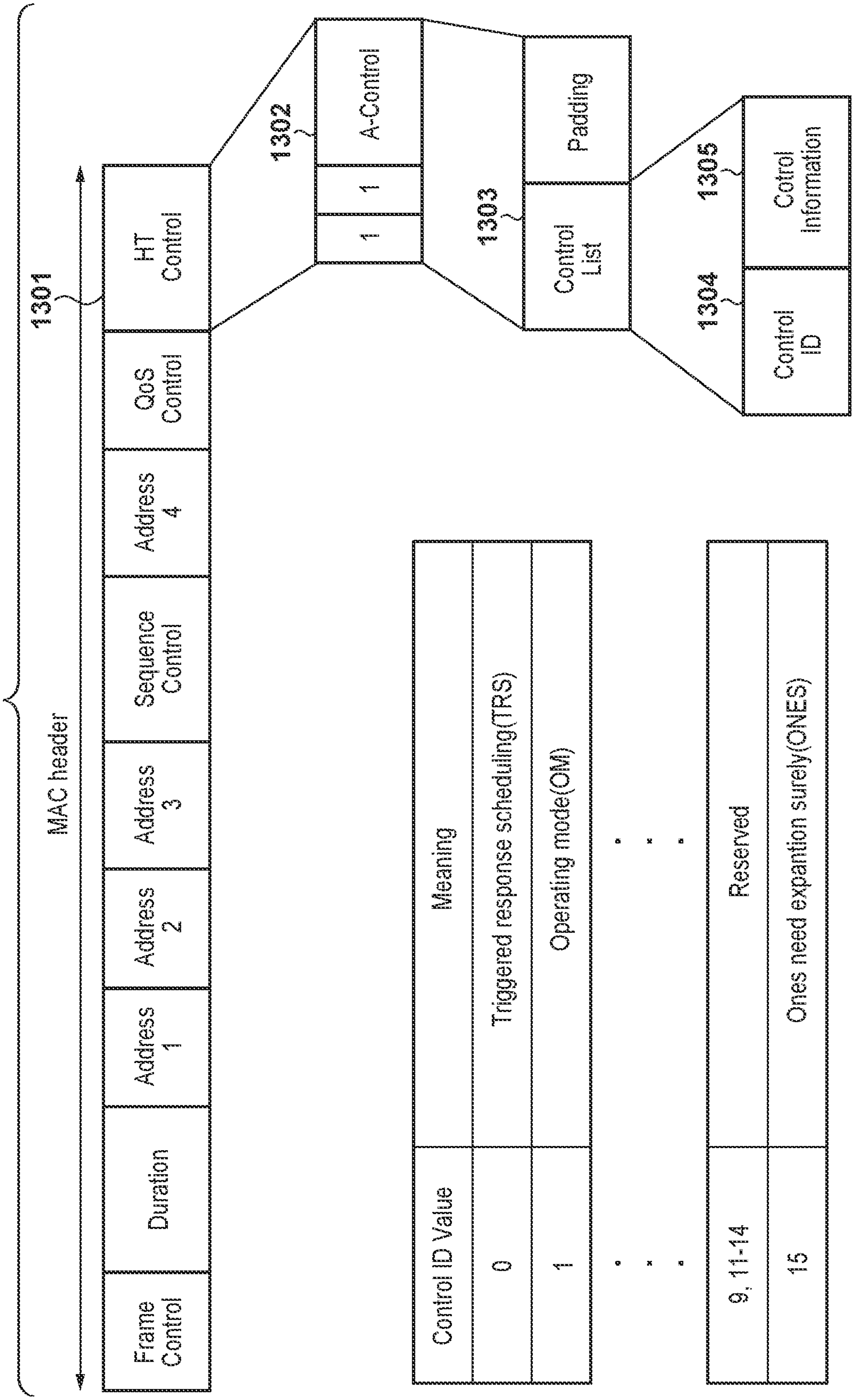
FIG. 13 is a view showing an example of the configuration of a Control ID subfield value according to the embodiment.

Also, in this embodiment, the operation mode is notified using the EHT Action field and the Protected Action field. However, the fields to be used are not limited to these. For example, as shown in FIG. 13, a subfield for notifying the STR/NSTR operation mode may be included in a MAC header. Using a Control Information field 1305 in a Control List 1303 in an A-Control field 1302 included in an HT Control field 1301 of the MAC header, a type corresponding to NSTR OMN may be added to one of the reserved Control ID Values.

Figure 14:
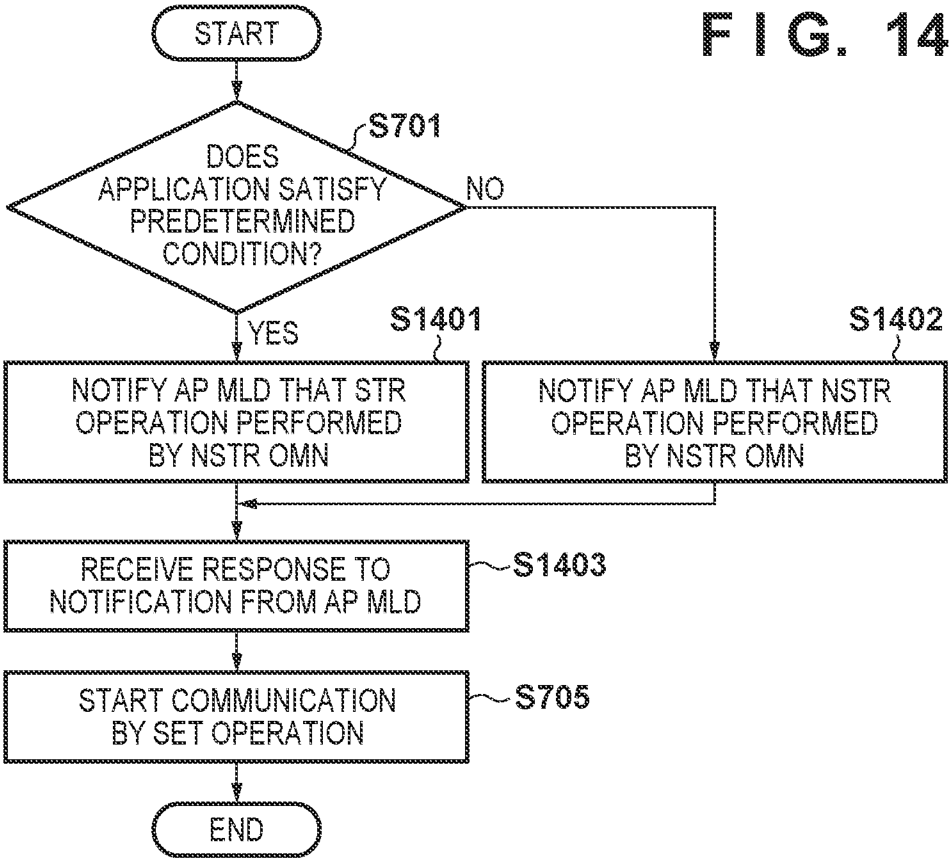
FIG. 14 is a flowchart showing the operation procedure of a communication apparatus (Non-AP MLD) according to the third embodiment.

FIG. 14 is a flowchart showing processing of the Non-AP MLD according to this embodiment.

As in the first and second embodiments, processing is started in accordance with start-up of a communication application as a trigger, and the process branches to the STR or NSTR operation depending on whether ACK is dominant in reception packets in the communication application started up (step S701). If ACK is dominant, the process advances to step S1401. If ACK is not dominant in the communication application, the process advances to step S1402.

In step S1401, the Non-AP MLD notifies the AP MLD 102, using the above-described method, that the operation is performed in the STR mode. In step S1402, the Non-AP MLD 101 notifies the AP MLD 102, using the NSTR OMN, that the operation is performed in the NSTR mode. In step S1402, if the communication application determined "NO" in step S701 mainly performs reception of data of a high MCS, the Non-AP MLD may notify that the operation is performed in the NSTR mode. Otherwise, the Non-AP MLD may notify an arbitrary operation mode. After that, in step S1403, the Non-AP MLD receives a response of NSTR OMN from the AP MLD 102 and starts communication in the set operation mode.

As described above, by using an action frame at the time of start-up of the communication application, the operation mode can be notified without reconnection, in addition to the same effects as in the first and second embodiments.

Fourth Embodiment

In the first to third embodiments, processing for increasing the opportunity of operating in STR has been described. However, this is processing performed when a communication application configured to mainly perform transmission in which ACK is dominant in reception packets. If reception of data other than ACK is included, or to more reliably receive data, the NSTR mode is suitable. A case can also be assumed where packet transmission/reception is done between the Non-AP MLD and the AP MLD even if no communication application is started up. For this reason, except the time in which a communication application configured to operate in the STR mode is started up, it is preferable to stand by in the NSTR mode is set unless connection is completely disconnected. In this embodiment, processing of changing the operation mode after the end of a communication application will be described. The same reference numerals as in the first to third embodiments denote the same functions, processes, or components, and a description thereof will be omitted.

Figure 15:
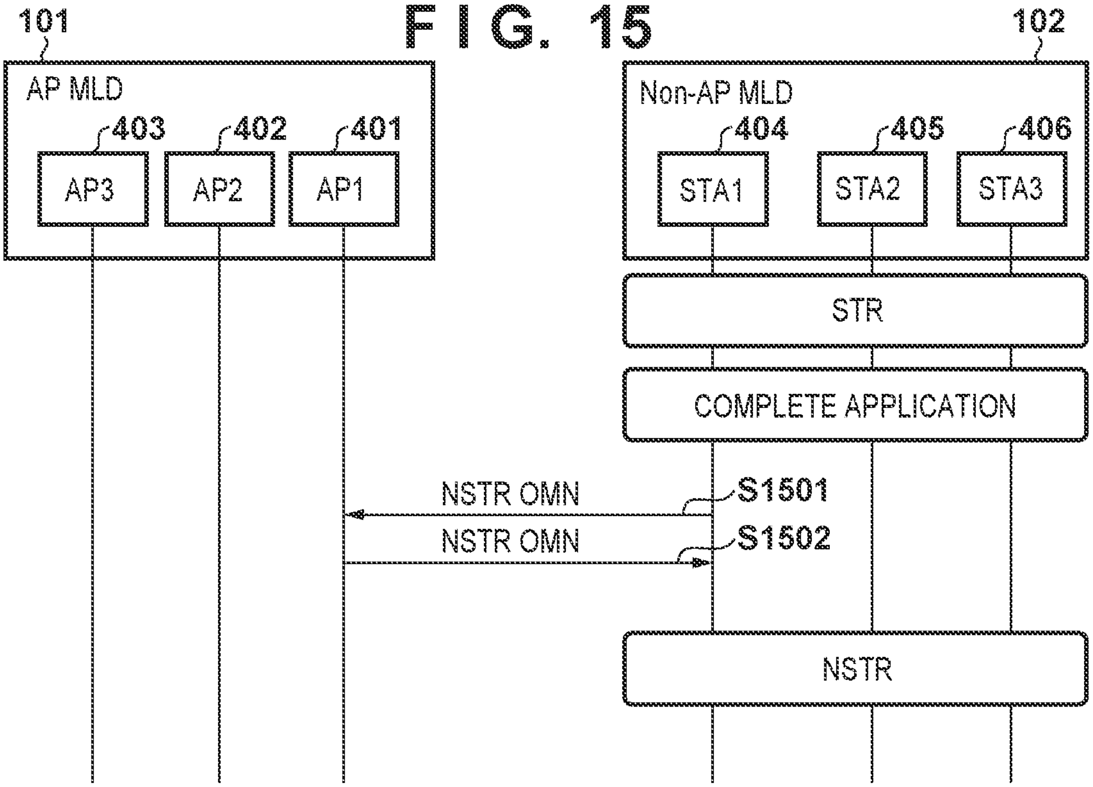
FIG. 15 is a sequence chart in operation mode switching according to the fourth embodiment.

FIG. 15 shows a sequence chart between a Non-AP MLD 101 and an AP MLD 102 according to this embodiment. After the end of a communication application operating in the STR, the Non-AP MLD 101 notifies the AP MLD, using an NSTR OMN, that the operation mode changes to the NSTR mode (S1501). In response to this, the AP MLD 102 returns an NSTR OMN (S1502), and the operation mode changes to the NSTR mode after the communication application is ended.

Figure 16:
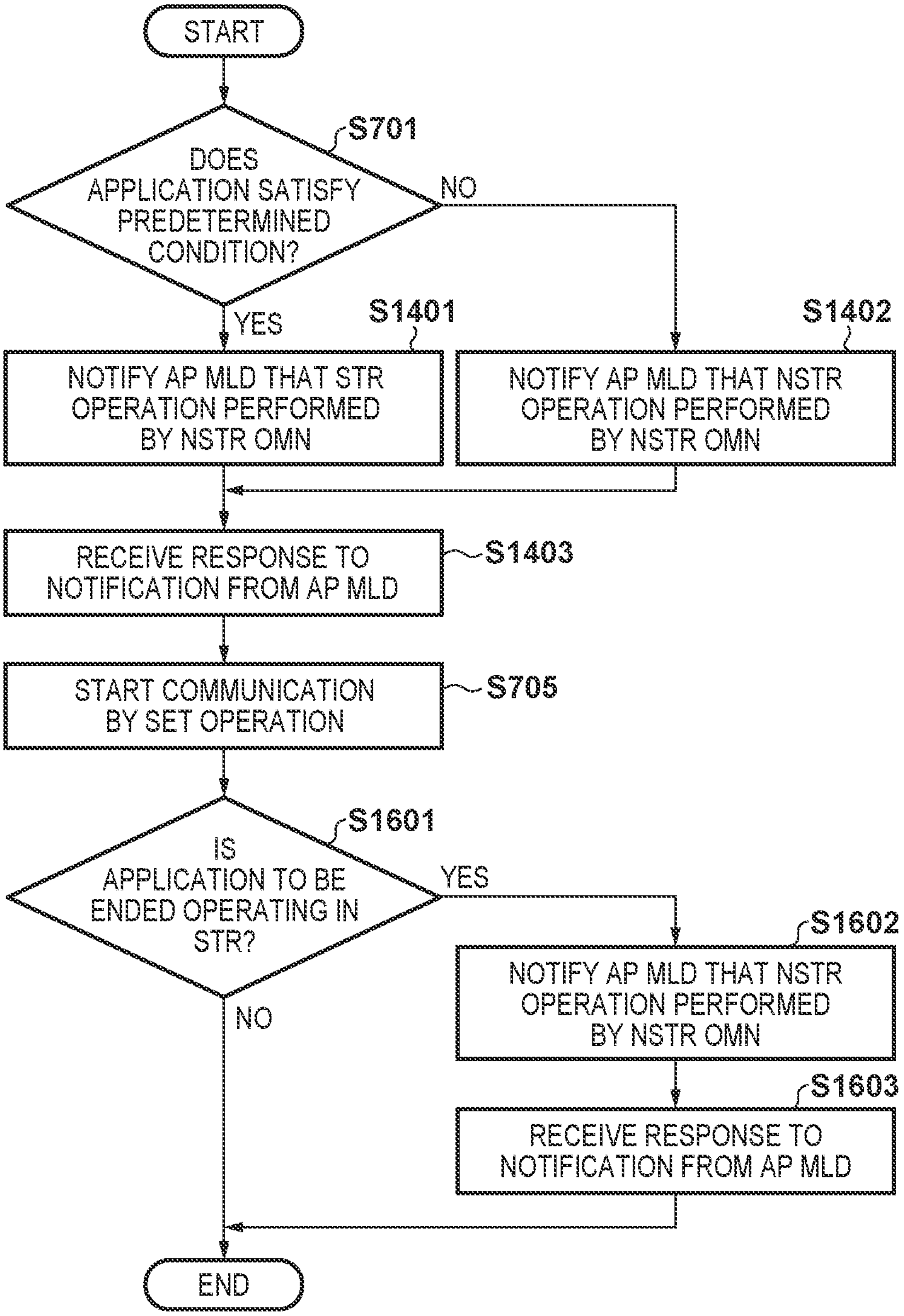
FIG. 16 is a flowchart showing the operation procedure of a communication apparatus (Non-AP MLD) according to the fourth embodiment.

FIG. 16 is a flowchart showing processing of the Non-AP MLD 101 according to this embodiment. Processing before a process S1601 is the same as in the first to third embodiments. When ending the communication application, it is judged whether the communication application is operating in the STR mode (step S1601). If the communication application is operating in the STR mode (YES in step S1601), the Non-AP MLD notifies the AP MLD, using the NSTR OMN, that the operation mode changes to the NSTR mode (step S1602), and receives a response from the AP MLD 102 (step S1603), thereby changing the operation mode to NSTR. If the communication application to be ended is operating in the NSTR mode (NO in step S1601), the operation is directly ended.

As described above, when the operation mode is always set to the NSTR mode after the end of the communication application, it is possible to prepare for interference in the standby state. Also, the notification of the operation mode in this embodiment is done using the NSTR OMN. However, the present invention is not limited to this, and an association request frame as in the first to third embodiments, or another management frame may be used.

Fifth Embodiment

In the first to fourth embodiments, the description has been made assuming that whether an application operates in the STR mode is designated in advance. However, control may be performed for one application such that it operates in the STR mode if communication quality is high, or operates in the NSTR mode if communication quality is low.

In this embodiment, a case where the STR/NSTR operation is switched for one application will be described. The same reference numerals as in the first to fourth embodiments denote the same functions, processes, or components, and a description thereof will be omitted.

Figures 17, 18:
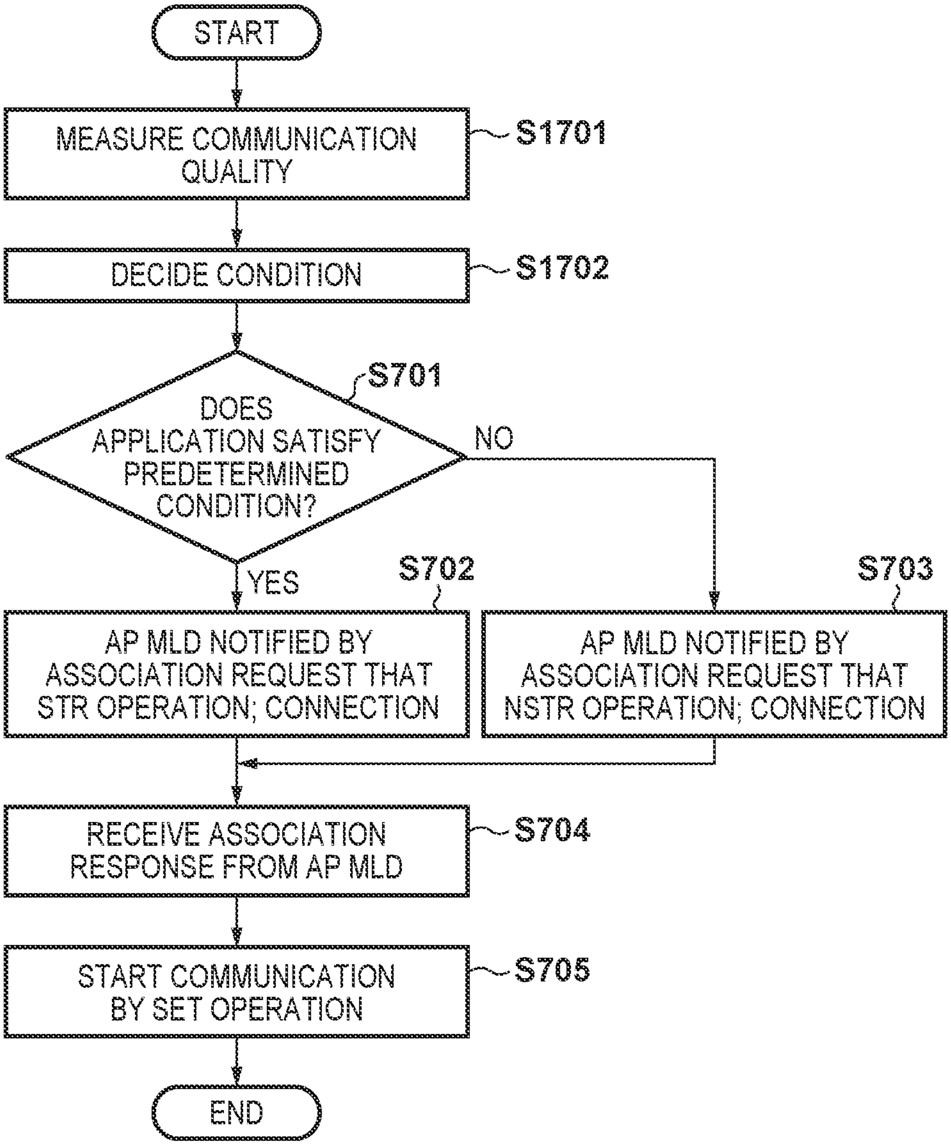
FIG. 17 is a flowchart showing the operation procedure of a communication apparatus (Non-AP MLD) according to the fifth embodiment.
FIG. 18 is a view showing the correspondence between an application, the magnitude of the influence of inter-link interference, and an operation mode according to the fifth embodiment.

FIG. 17 shows an example of processing executed by a Non-AP MLD 101 according to this embodiment.

In step S1701, the Non-AP MLD 101 measures the communication quality of a communication link established for an AP MLD 102. For example, a signal strength received from the AP MLD 102 is measured. Alternatively, during signal transmission from the Non-AP MLD 101 using a predetermined frequency channel, a reception signal strength is measured using a frequency channel different from the predetermined frequency channel.

Next, in step S1702, the Non-AP MLD 101 decides a predetermined condition. For example, if the signal strength received from the AP MLD 102 is a predetermined strength (first threshold) or more, a packet from the AP MLD 102 can be received at high possibility even if inter-channel interference occurs. Hence, it is determined, for a predetermined application, that it operates in the STR mode. In another example, if the reception signal strength measured, during signal transmission from the Non-AP MLD 101 using a predetermined wireless link, in a wireless link different from the predetermined wireless link is a predetermined value (second threshold) or less, it can be determined that inter-link interference is the predetermined value or less. Hence, it can be determined, for a predetermined application, that it operates in the STR mode.

In an example, the first threshold concerning the signal strength received from the AP MLD 102 may be defined for each application. For example, for an application in which the communication quality of a reception packet is allowed to be low, like a scan application, the first threshold is set low. Also, for an application that requires high communication quality of a reception packet, like a print application, the first threshold may be set high.

In addition, the second threshold concerning the reception signal strength measured, during signal transmission from the Non-AP MLD 101 using a predetermined frequency channel, using a frequency channel different from the predetermined frequency channel may be defined for each application. For example, for an application in which the communication quality of a reception packet is allowed to be low, like a scan application, the second threshold is set high. On the other hand, for an application that requires high communication quality of a reception packet, like a print application, the second threshold may be set low.

In this way, in step S1702, the conditions of the application operated in the STR mode and the application operated in the NSTR mode are decided in accordance with the reception signal strength.

FIG. 18 shows the correspondence between an application, the magnitude of the influence of inter-link interference, and an operation mode. In step S1702, which one of a column 1801 and a column 1802 in FIG. 18 is to be used is decided based on the magnitude of the influence of inter-link interference measured in step S1701, and in step S701, the operation mode can be determined in accordance with the type of the application.

Processing from step S702 is the same as in the first embodiment, and a description thereof will be omitted.

As described above, according to this embodiment, it is possible to appropriately decide an application to be operated in the STR mode in accordance with the communication environment.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-189528, filed Nov. 28, 2022, hereby incorporated by reference herein in its entirety.

What is claimed is:

1. A wireless communication apparatus, comprising:
at least one memory that stores a set of instructions; and
at least one processor that executes the instructions,
the instructions, when executed, causing the wireless communication apparatus to perform operations comprising:
establishing a plurality of wireless links with another wireless communication apparatus;
communicating while switching an operation mode between a first operation mode in which, while a packet is being transmitted to the other wireless communication apparatus via a first link of the plurality of wireless links, a packet is receivable from the other wireless communication apparatus via a second link different from the first link, and a second operation mode in which, while the packet is being transmitted via the first link, the packet is not received via the second link; and
switching the operation mode from the second operation mode to the first operation mode when a ratio of acknowledgement packets to packets received from the other wireless communication apparatus in a started application is higher than a ratio of acknowledgement packets to packets received from the other wireless communication apparatus in another application.

2. The wireless communication apparatus according to claim 1, wherein the operations further comprise switching the operation mode from the second operation mode to the first operation mode when a ratio of packets modulated and coded according to a modulation and coding scheme (MCS) having an index in a set of MCS indices consisting of 0, 1, 2, 3, and 4 to packets received from the other wireless communication apparatus in the started application is higher than a ratio of packets modulated and coded according to the modulation and coding scheme having an index in the set of MCS indices consisting of 0, 1, 2, 3, and 4 to packets received from the other wireless communication apparatus in another application.

3. The wireless communication apparatus according to claim 1, wherein the operations further comprise switching the operation mode from the second operation mode to the first operation mode when a ratio of packets modulated by a modulation scheme in which a number of bits assigned for one modulation symbol is not more than a predetermined value to packets received from the other wireless communication apparatus in the started application is higher than a ratio of the packets modulated by the modulation scheme in which the number of bits assigned for one modulation symbol is not more than the predetermined value to packets received from the other wireless communication apparatus in another application.

4. The wireless communication apparatus according to claim 1, wherein the operations further comprise switching the operation mode from the second operation mode to the first operation mode when a ratio of packets encoded by an encoding method of an encoding rate not more than a predetermined value to packets received from the other wireless communication apparatus in the started application is higher than a ratio of packets encoded by the encoding method of the encoding rate not more than the predetermined value to packets received from the other wireless communication apparatus in another application.

5. The wireless communication apparatus according to claim 1, wherein the operations further comprise notifying the other wireless communication apparatus of the operation mode used for the communication.

6. The wireless communication apparatus according to claim 5, wherein the operations further comprise accepting a start-up instruction of the started application.

7. The wireless communication apparatus according to claim 5, wherein the notifying is performed using an action frame complying with IEEE 802.11be.

8. The wireless communication apparatus according to claim 6, wherein the operations further comprise:
accepting an end instruction of the started application after notifying the other wireless communication apparatus that an operation is performed in the first operation mode; and
notifying the other wireless communication apparatus that an operation is performed in the second operation mode based on accepting the end instruction.

9. The wireless communication apparatus according to claim 6, wherein the operations further comprise, when a start-up instruction of another application is accepted after the other wireless communication apparatus is notified that an operation is performed in the first operation mode and before an end instruction of the started application is accepted, causing the communication to be performed in the second operation mode.

10. The wireless communication apparatus according to claim 7, wherein the action frame includes at least one of a Maximum Number Of Simultaneous Links subfield, a Non-Simultaneous Transmit and Receive (NSTR) Link Pair Present subfield, an NSTR Bitmap Size subfield, an NSTR Indication Bitmap subfield, and a subfield that exclusively indicates one of a Simultaneous Transmit and Receive (STR) operation mode and an NSTR operation mode.

11. The wireless communication apparatus according to claim 1, further comprising a printer and a scanner, wherein the printer performs printing on a print medium and the scanner reads an image printed on the print medium, and wherein the started application is one of an application configured to transmit image data acquired via the scanner to the other wireless communication apparatus and an application configured to print image data received from the other wireless communication apparatus on the print medium via the printer.

12. A communication control method, comprising:

establishing a plurality of wireless links with another wireless communication apparatus;

communicating while switching an operation mode between a first operation mode in which, while a packet is being transmitted to the other wireless communication apparatus via a first link of the plurality of wireless links, a packet is receivable from the other wireless communication apparatus via a second link different from the first link, and a second operation mode in which, while the packet is being transmitted via the first link, the packet is not received via the second link; and switching the operation mode from the second operation mode to the first operation mode when a ratio of acknowledgement packets to packets received from the other wireless communication apparatus in a started application is higher than a ratio of acknowledgement packets to packets received from the other wireless communication apparatus in another application.

13. A non-transitory computer-readable storage medium storing instructions that, when executed by at least one processor, cause a wireless communication apparatus to perform operations comprising:

establishing a plurality of wireless links with another wireless communication apparatus;

communicating while switching an operation mode between a first operation mode in which, while a packet is being transmitted to the other wireless communication apparatus via a first link of the plurality of wireless links, a packet is receivable from the other wireless communication apparatus via a second link different from the first link, and a second operation mode in which, while the packet is being transmitted via the first link, the packet is not received via the second link; and switching the operation mode from the second operation mode to the first operation mode when a ratio of acknowledgement packets to packets received from the other wireless communication apparatus in a started application is higher than a ratio of acknowledgement packets to packets received from the other wireless communication apparatus in another application.

* * * * *